(12) United States Patent
Williams (10) Patent No.: US 8,366,992 B2
(45) Date of Patent: Feb. 5, 2013

(54) GAS INJECTION LANCE

(75) Inventor: Trevor Williams, Boweya via Glenrowan (AU)

(73) Assignee: Technological Resources Pty. Limted, Melbourne, Victoria (AU)

(*) Notice: Subject to any disclaimer, the term of this patent is extended or adjusted under 35 U.S.C. 154(b) by 872 days.

(21) Appl. No.: 11/665,467

(22) PCT Filed: Oct. 14, 2005

(86) PCT No.: PCT/AU2005/001591
§ 371 (c)(1),
(2), (4) Date: Mar. 18, 2008

(87) PCT Pub. No.: WO2006/096902
PCT Pub. Date: Sep. 21, 2006

(65) Prior Publication Data
US 2009/0014928 A1    Jan. 15, 2009

(30) Foreign Application Priority Data

Oct. 15, 2004  (AU) ............................ 2004906004
Oct. 15, 2004  (AU) ............................ 2004906006
Mar. 7, 2005   (AU) ............................ 2005901071

(51) Int. Cl.
*C21C 5/32* (2006.01)
*B23P 19/00* (2006.01)
*B23P 11/00* (2006.01)
*B21D 39/03* (2006.01)

(52) U.S. Cl. .................... 266/225; 29/426.1; 29/428

(58) Field of Classification Search ............. 29/426.1, 29/428; 266/225
See application file for complete search history.

(56) References Cited

U.S. PATENT DOCUMENTS

| 4,465,265 | A  | * | 8/1984  | Kryczun et al. | ............... 266/226 |
| 4,732,370 | A  |   | 3/1988  | Berry et al. |   |
| 5,377,960 | A  | * | 1/1995  | Leczo et al. | ................. 266/225 |
| 6,673,305 | B2 |   | 1/2004  | Dunne et al. |   |
| 2002/0158377 | A1 | * | 10/2002 | Dunne et al. | ................. 266/217 |
| 2004/0074060 | A1 | * | 4/2004  | Browne et al. | ................. 24/442 |

* cited by examiner

FOREIGN PATENT DOCUMENTS

WO    WO-96/31627    10/1996

*Primary Examiner* — Stuart Hendrickson
*Assistant Examiner* — Alexander Polyansky
(74) *Attorney, Agent, or Firm* — Finnegan, Henderson, Farabow, Garrett & Dunner, LLP (57) ABSTRACT

A hot gas injection lance (26) for injecting hot gas into a vessel (11) is made of three modules (26A, 26B and 26C) which all fabricated separately and brought together in successive steps and connected together by releasable fastenings. Lance module (26A) is a main duct module providing an elongate duct (31) through which to direct hot gas into an upper region of the vessel. Lance module (26B) is a gas inlet module through which to direct hot gas into duct (31) of module (26A). Lance module (26C) is a central module which includes an elongate central tubular structure (33) that extends within the gas flow duct (31) and carries at its lower end a series of swirl imparting tubular structure (33) that extends within the gas flow duct (31) and carries at its lower end a series of swirl imparting vanes (34) for imparting swirl to the gas flow exiting the duct. Main duct module (26A) has a mounting flange (110) that abuts a flange (122) on vessel (11) and the flanges (110, 122) are fastened together by bolts (121). Gas inlet module has a lower mounting flange 111 which abuts a flange (103) at the upper end of module (26A) and the flanges (111, 103) are connected together by bolts (112). Central module (26C) has a mounting flange (115) that abuts a flange (114) at the upper end of inlet module (26B) and the flanges (114, 115) are fastened together by bolts (116).

23 Claims, 11 Drawing Sheets

GAS INJECTION LANCE

TECHNICAL FIELD

The present invention relates to lances for injecting gas into a vessel.

The invention has particular, but not exclusive, application to a lance for injecting a flow of preheated gas into a metallurgical vessel under high temperature conditions.

The metallurgical vessel may for example be a direct smelting vessel in which molten metal is produced by a direct smelting process.

A known direct smelting process, which relies on a molten metal layer as a reaction medium, and is generally referred to as the HIsmelt process, is described in International application PCT/AU96/00197 (WO 96/31627) in the name of the applicant.

The HIsmelt process as described in the International application comprises:

(a) forming a bath of molten iron and slag in a vessel;
(b) injecting into the bath:
(i) a metalliferous feed material, typically metal oxides; and
(ii) a solid carbonaceous material, typically coal, which acts as a reductant of the metal oxides and a source of energy; and
(c) smelting metalliferous feed material to metal in the metal layer.

The term "smelting" is herein understood to mean thermal processing wherein chemical reactions that reduce metal oxides take place to produce liquid metal.

The present invention also provides a direct smelting apparatus which includes a lance for injecting gas into a direct smelting vessel.

The invention further provides methods of installing a gas injection lance in a metallurgical vessel and of removal.

In general, molten bath-based processes for direct smelting ferrous material into molten iron that are described in the prior art require post-combustion of reaction products such as CO and $H_2$ released from a molten bath in order to generate sufficient heat to maintain the temperature of the molten bath.

The prior art generally proposes that post combustion be achieved by injecting oxygen-containing gas via lances that extend into a top space of a direct smelting vessel.

For economic reasons, it is desirable that direct smelting campaigns be relatively long, typically at least one year, and therefore it is important that gas injection lances be capable of withstanding the high temperature environment, typically of the order of 2000° C., within the top space of a direct smelting vessel for the prolonged periods of campaigns.

One option for providing oxygen-containing gas is to use air or oxygen-enriched air that is preheated to above 800° C. Considerably larger volumes of such gas are required to achieve a given level of post combustion than would be required if oxygen was used as the oxygen-containing gas. Consequently, a direct smelting vessel operating with air or oxygen-enriched air must be a considerably larger structure than a direct smelting vessel operating with oxygen. Accordingly, a lance for injecting air or oxygen-enriched air into a direct smelting vessel must be a relatively large structure that can extend a substantial distance into a direct smelting vessel and be unsupported over at least a major part of the length of the lance. By way of context, 6 meter diameter HIsmelt vessels proposed by the applicant include lances having an outer diameter of 1.2 m that are of the order of 60 tonnes and extend approximately 10 m into the vessel.

DISCLOSURE OF THE INVENTION

According to one aspect, the invention provides a lance for injecting gas into a vessel, including a gas flow duct extending from a rear end to a forward end from which to discharge gas from the duct;

an elongate central structure extending within the gas flow duct from its rear end to its forward end;

a plurality of flow directing vanes disposed about the central structure adjacent the forward end of the duct to impart swirl to a gas flow through the forward end of the duct;

cooling water supply and return passages extending through the wall of the gas flow duct and extending from the rear end to the forward end of the gas flow duct for supply and return of cooling water to the forward end of the duct; and an annular duct tip disposed at the forward end of the duct and having an internal cooling water passage connecting with the cooling water supply and return passages so as to receive and return a flow of cooling water to internally cool the duct tip;

wherein the lance is made of three modules releasably fastened together by releasable fasteners, said modules comprising:

1) a main duct module forming the gas flow duct throughout a major part of the length of that duct and including said water supply and return passages and said annular duct tip, 2) a gas inlet module including a tubular body releasably fastened by a first set of said fasteners to a rear end of the main duct module such that its interior connects with the interior of the duct module and a branch tube branching laterally from the tubular body to serve as a gas inlet for inlet of gas to the tubular body and thence to the interior of the main gas module, and 3) a central module forming said elongate central structure and said flow directing vanes and releasably fastened by a second set of said fasteners to a rear end of the tubular body of the gas inlet module.

The rear end of the main duct module and the forward end of the gas inlet module may be formed with abutting circumferential flanges and the first set of fasteners may releasably fasten those flanges together.

The rear end of the tubular body of the gas inlet module and the rear end of the central module may also be formed with abutting circumferential flanges and the second set of fasteners may releasably fasten those flanges together.

The main duct module may include an outwardly projecting circumferential flange spaced forwardly from the rear end of the module for mounting the lance on a wall of a metallurgical vessel.

The latter flange may be disposed about a tubular sleeve extending circumferentially around the duct and provided with internal water flow passages for internal cooling of the sleeve.

The sleeve may extend forwardly from said outwardly projecting circumferential flange so as in use of the lance to project into an opening in a wall of the vessel in which the lance is to be mounted.

The main duct module may comprise water inlet and outlet connectors connecting with the cooling water and supply return passages and disposed between the rear end of the main duct module and the outwardly projecting circumferential mounting flange.

Preferably the main duct module, gas inlet module and central module each further comprises at least one cooling circuit for in use receiving a flow of cooling water, the cooling circuits operating independently.

Preferably the supply and return passages of the main module comprise substantially parallel annular flow paths provided by three or more concentric substantially cylindrical members retained within said module to provide for differential expansion of two or more of said substantially cylindrical members and the gas inlet module comprises two concentric substantially cylindrical members to provide a single layer flow path for cooling water between said substantially cylindrical members.

Preferably one or more partitions provide said single layer flow path of said gas inlet module with two or more water flow galleries.

Preferably said single layer flow path comprises two independent water flow circuits.

Preferably the gas inlet member comprises a branch tube extending laterally from a central axis of the inlet module and the branch tube comprising a flange for connection to a gas supply duct, the single layer flow path extending about said branch tube.

According to a second aspect, the invention provides a lance for injecting gas into a vessel having an opening for receiving the lance, the lance comprising a tubular lance body defining a gas flow duct for flow of gas through the lance adapted to extend through the vessel opening into the vessel, a lance mounting circumferential flange projecting outwardly from the lance body, and a tubular sleeve extending circumferentially around the lance body in the vicinity of the mounting flange.

Preferably the sleeve is provided with internal water flow passages for internal cooling of the sleeve.

Preferably the outer diameter of the sleeve is selected so that, in use, the lance body and a layer of frozen slag that forms on the lance body can be withdrawn from the vessel via the vessel opening without contacting the vessel opening.

The sleeve may extend along the lance body from the mounting flange so as in use of the lance to project into the opening of the vessel in which the lance is to be mounted.

According to a further aspect the present invention provides a lance for injecting gas into a vessel comprising a tubular lance body defining a gas flow duct and comprising elongate cooling water supply and return passages for supply of cooling water to a tip of said tubular lance body, and said tubular lance body further comprised of three or more concentric substantially cylindrical members to provide said elongate supply and return passages and said substantially cylindrical members retained within said lance so as to provide for differential expansion of two or more of said substantially cylindrical members and the lance further comprising a gas inlet member adapted to in use connect with and receive gas from a gas supply duct and said gas inlet member having a gas flow passage in fluid communication with said gas flow duct and said gas inlet member comprising two concentric substantially cylindrical members providing a single layer flow path for flow of cooling water between said substantially cylindrical members.

Preferably the supply and return flow paths of the tubular member operate independently of the single layer flow path of the inlet member.

Preferably one or more partitions provide said single layer flow path of said gas inlet member with two or more water flow galleries.

Preferably said single layer flow path comprises two independent water flow circuits.

Preferably the gas inlet member comprises a branch tube extending laterally from an axis of the inlet member and the branch tube comprises a flange for connection to a gas supply duct, the single layer flow path extending about said branch tube.

In use, a lance of the present invention may be mounted in an upper wall of a metallurgical vessel so as to extend downwardly into that vessel. The vessel may be a direct smelting vessel in which molten metal is produced by a direct smelting process.

Accordingly, the invention further provides apparatus for producing ferrous metal from a ferrous feed material by a direct smelting process which apparatus includes a vessel that can contain a bath of molten metal and molten slag and a gas space above the molten bath, and a gas injection lance in accordance with said first aspect or said second aspect of the invention extending downwardly into the vessel for injecting gas into the vessel.

In particular, the invention may provide apparatus for producing ferrous metal from a ferrous feed material by a direct smelting process, which apparatus includes a vessel that can contain a bath of molten metal and molten slag and a gas space above the molten bath and a gas injection lance in accordance with said first aspect extending downwardly into the vessel for injecting oxygen-containing gas into the vessel, wherein the main duct module of the lance is mounted in an upper wall of the vessel so as to extend downwardly into the vessel from an upper (rear) end located outside the vessel, the gas inlet module sits on and is supported by the upper end of the main duct module and the central module is suspended from its connection with the upper (rear) end of the gas inlet module so as to hang vertically downwards within the tubular body of the gas inlet module and the interior of the main duct module.

The vanes on the central module may extend within the duct tip and be dimensioned such that during operation of the apparatus they are engaged and supported laterally of the duct by the internally water cooled duct tip.

The invention further provides the method of installing in a metallurgical vessel a gas injection lance in accordance with said first aspect, which method comprises the steps of lifting the main duct module on a crane from its rear end so that it hangs vertically downward from its rear end, lowering the main duct module so that it extends downwardly into the vessel, releasably fastening an upper part of the main duct module on an upper wall of the vessel, lifting the gas inlet module on a crane and lowering it onto the upper end of the main duct module, releasably fastening the lower end of the gas inlet module to the upper end of the main duct module, lifting the central module on a crane from its rear end so that it hangs vertically downwards, lowering the central module on the crane until it extends downwardly through the tubular body of the gas inlet module and the interior of the main duct module and releasably fastening the upper end of the central module to the upper end of the gas inlet module.

BRIEF DESCRIPTION OF THE DRAWINGS

The invention further provides a method of removing a so installed gas injection lance from a metallurgical vessel comprising the steps of releasing the fastening of the upper end of the central module to the upper end of the gas inlet module, lifting the central module vertically out of the gas inlet and main duct modules by means of a crane and removing it away from the vessel, releasing the fastening of the lower end of the gas inlet module to the upper end of the main duct module, lifting the gas inlet module away from main duct module by means of a crane and moving it away from the vessel, releasing the fastening of the main duct module to the upper wall of the vessel, lifting the main duct module vertically by means of a crane to withdraw it from the vessel and moving it away from the vessel.

In order that the invention may be more fully explained, one particular form of lance and its method of installation in a metallurgical vessel will now be described in some detail with reference to the accompanying drawings in which.

DETAILED DESCRIPTION OF THE PREFERRED EMBODIMENT

The drawings illustrate a direct smelting vessel suitable for operation by the HIsmelt process as described in International Patent Application PCT/AU96/00197. The metallurgical vessel is denoted generally as 11 and has a hearth that includes a base 12 and sides 13 formed from refractory bricks; side walls 14 which form a generally cylindrical barrel extending upwardly from the sides 13 of the hearth and which includes an upper barrel section 15 and a lower barrel section 16; a roof 17; an outlet 18 for off-gases; a forehearth 19 for discharging molten metal continuously; and a tap-hole 21 for discharging molten slag.

In use, the vessel contains a molten bath of iron and slag which includes a layer 22 of molten metal and a layer 23 of molten slag on the metal layer 22. The arrow marked by the numeral 24 indicates the position of the nominal quiescent surface of the metal layer 22 and the arrow marked by the numeral 25 indicates the position of the nominal quiescent surface of the slag layer 23. The term "quiescent surface" is understood to mean the surface when there is no injection of gas and solids into the vessel.

The vessel is fitted with a downwardly extending hot air injection lance 26 for delivering a hot air blast into an upper region of the vessel and solids injection lances 27 extending downwardly and inwardly through the side walls 14 and into the slag layer 23 for injecting iron ore, solid carbonaceous material, and fluxes entrained in an oxygen-deficient carrier gas into the metal layer 22. The position of the lances 27 is selected so that their outlet ends 28 are above the surface of the metal layer 22 during operation of the process. This position of the lances reduces the risk of damage through contact with molten metal and also makes it possible to cool the lances by forced internal water cooling without significant risk of water coming into contact with the molten metal in the vessel.

Figure 1:
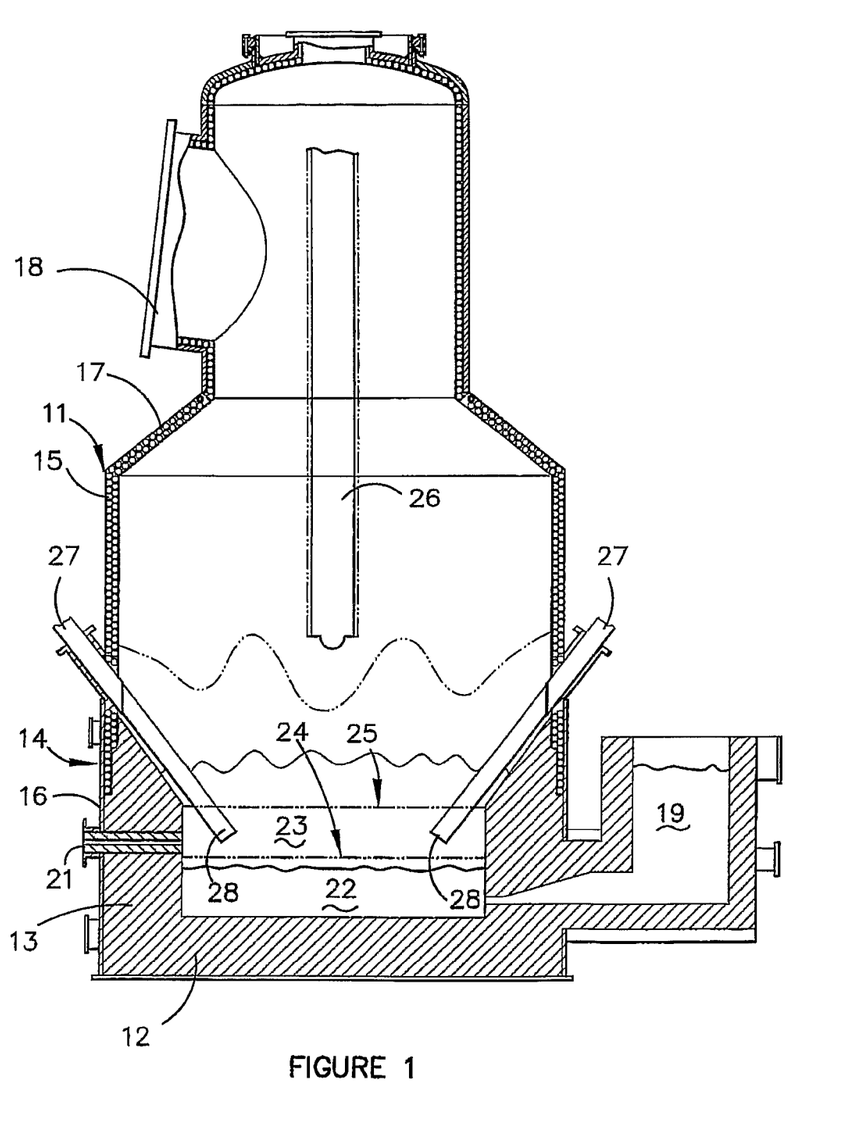
FIG. 1 is a vertical section through part of a direct smelting vessel incorporating a hot air injection lance constructed in accordance with the invention.
Figure 2:
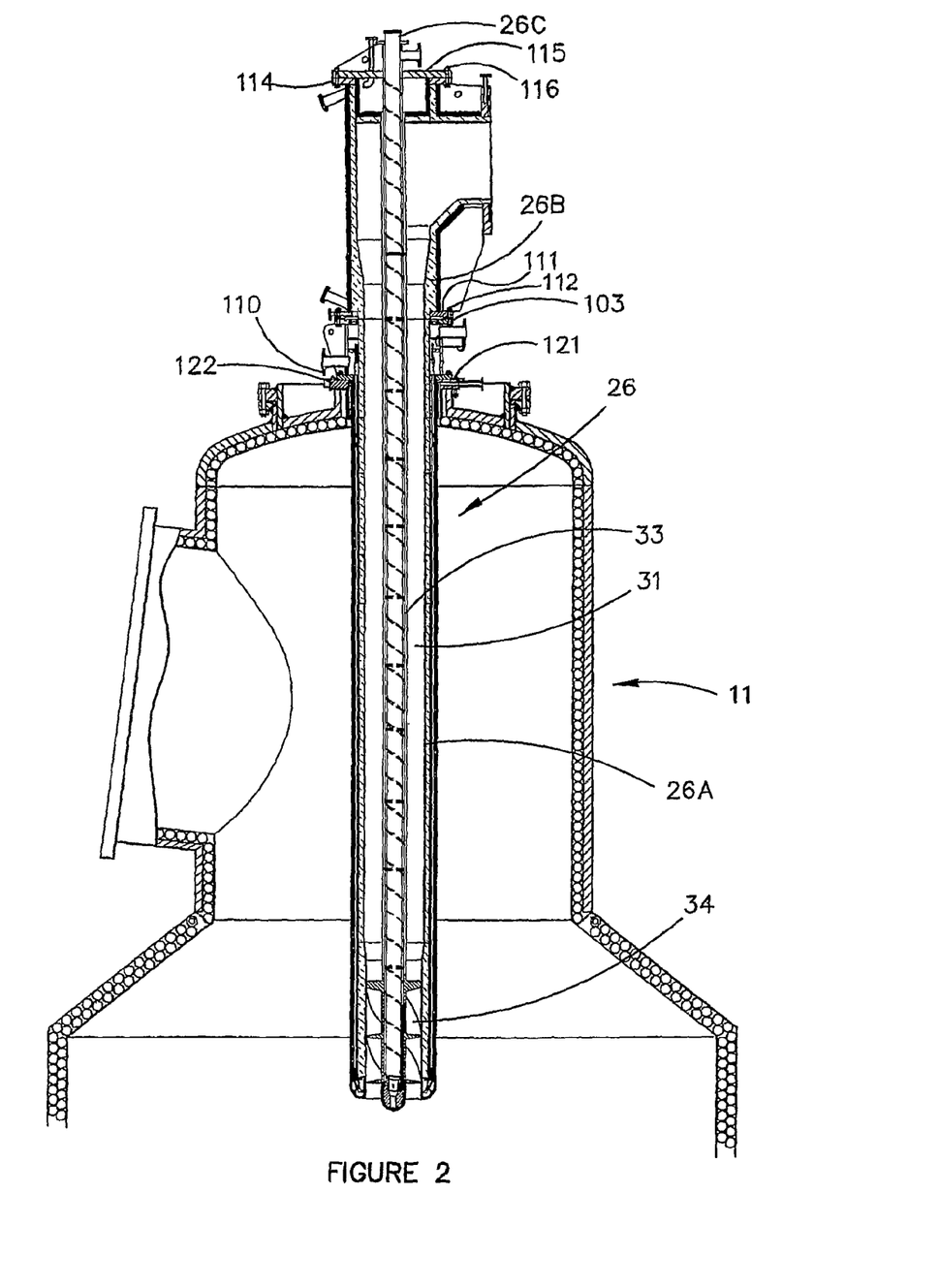
FIG. 2 is a vertical cross-section through an upper part of the smelting vessel and the hot air injection lance.
Figure 3:
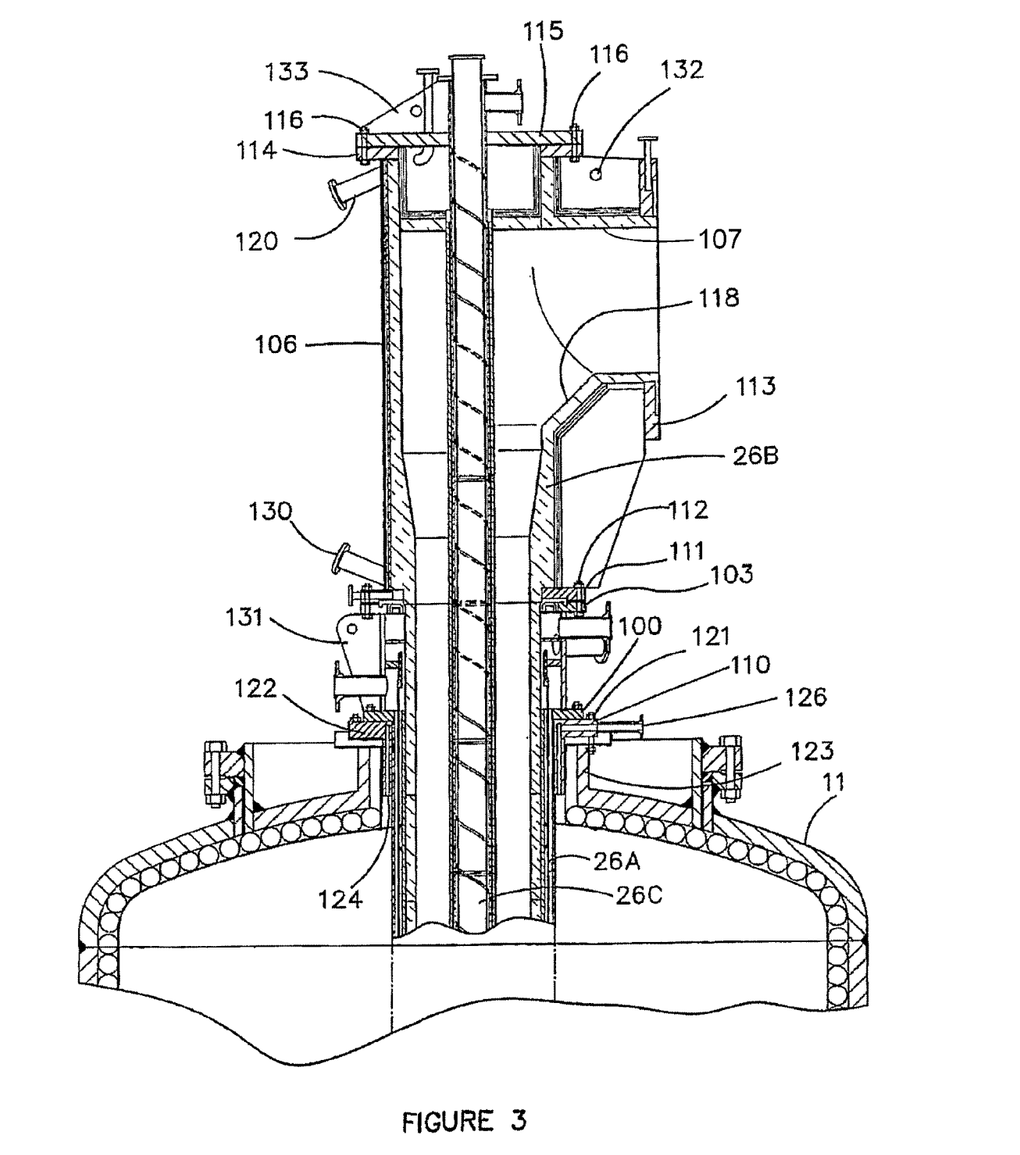
FIG. 3 is a cross-section to an enlarged scale of some of the components shown in FIG. 2.
Figure 4:
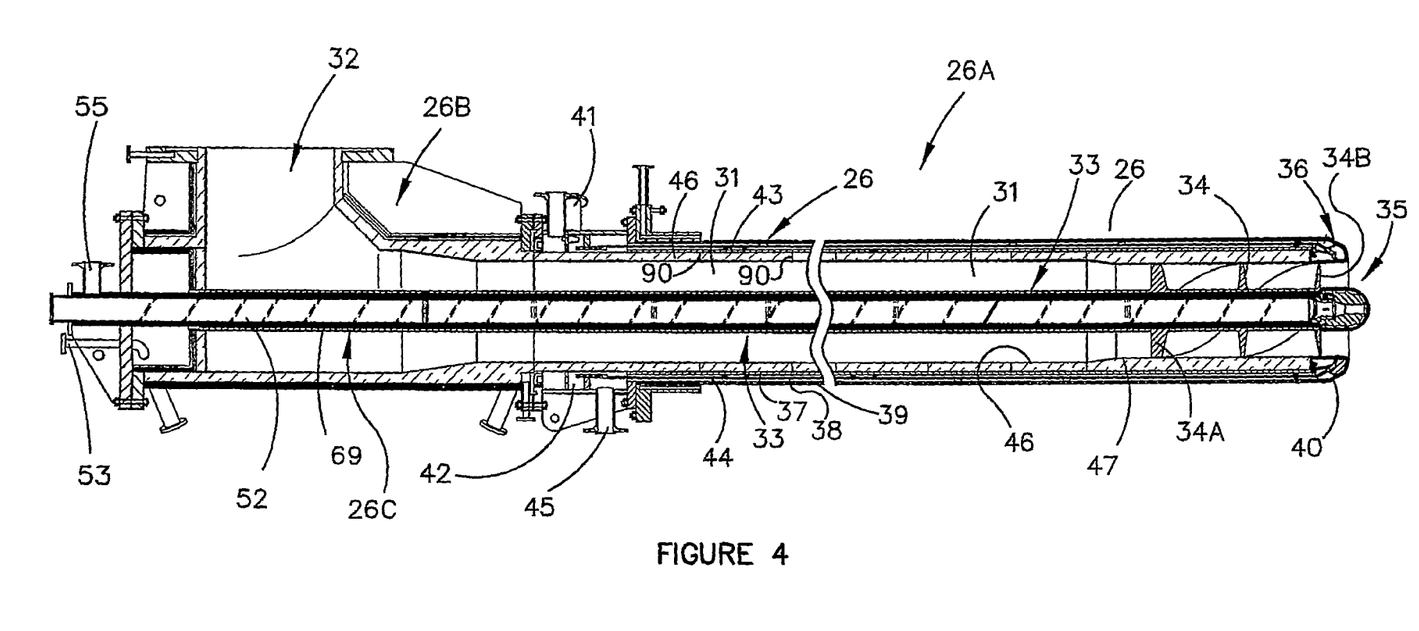
FIG. 4 is a longitudinal cross-section through the hot air injection lance.
Figure 5:
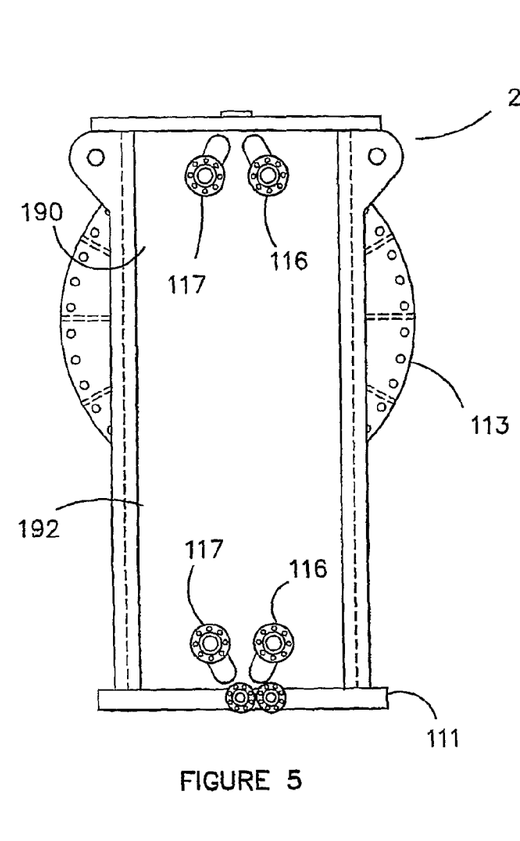
FIG. 5 is a side elevation of a gas inlet module of the hot air injection lance.
Figure 6:
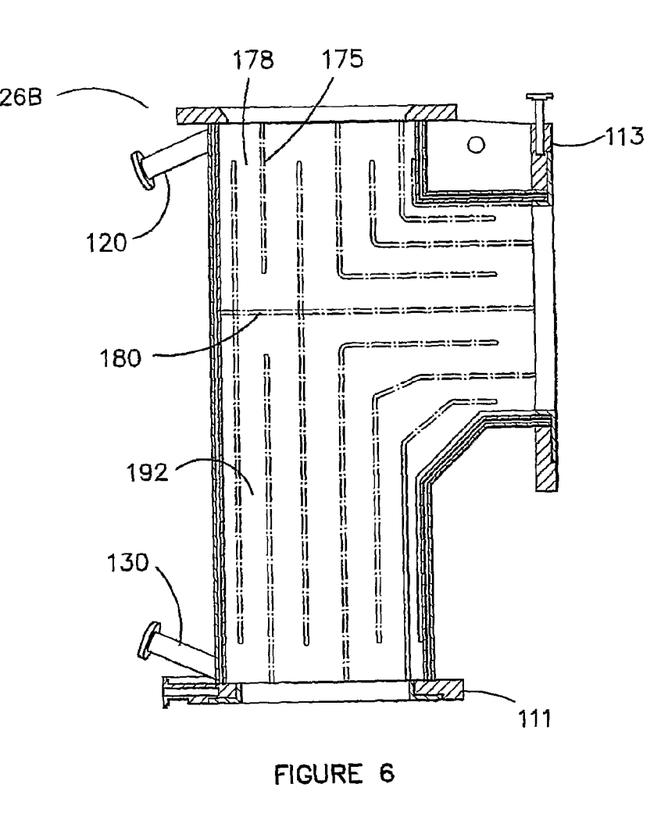
FIG. 6 is a cross sectional view of the gas inlet, module.
Figure 7:
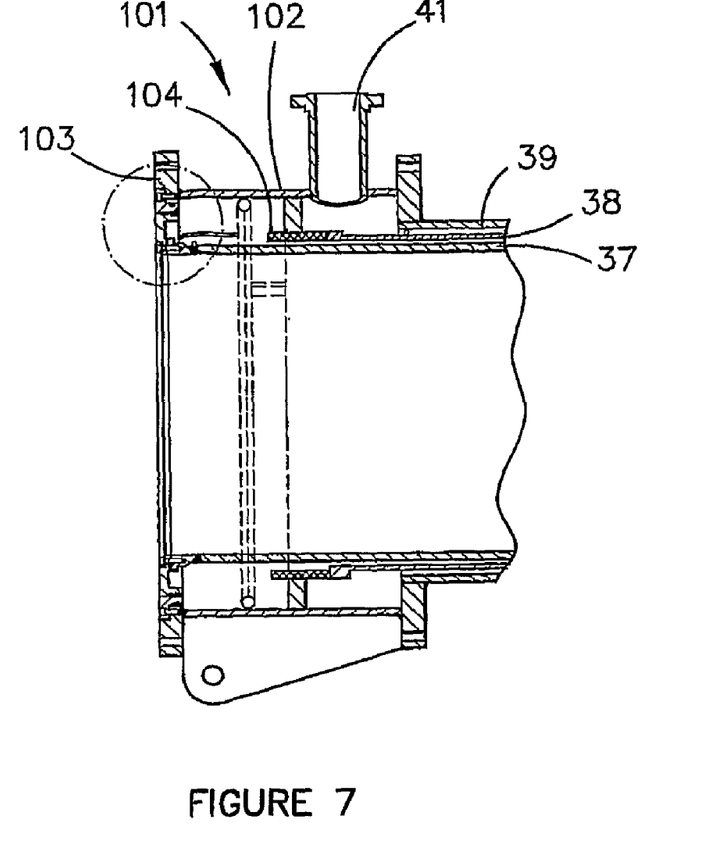
FIG. 7 illustrates components at the upper end of a main duct module forming part of the lance.
Figure 8:
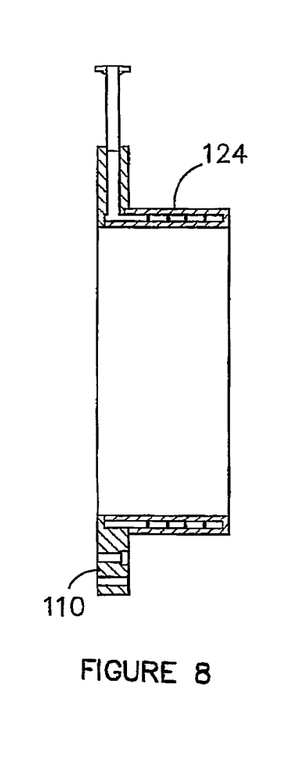
FIG. 8 is a cross-section through a duct mounting flange and sleeve.
Figure 9:
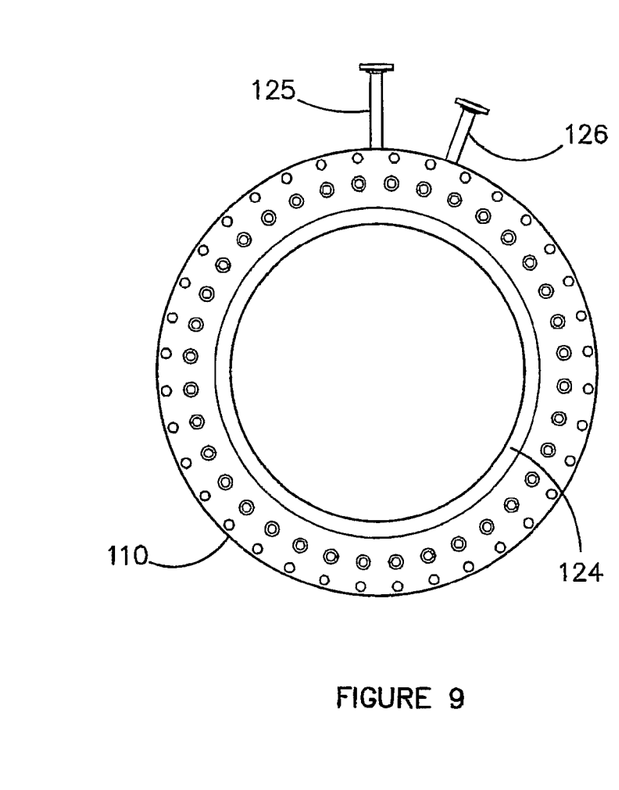
FIG. 9 is an end view of the duct mounting flange and sleeve.
Figure 10:
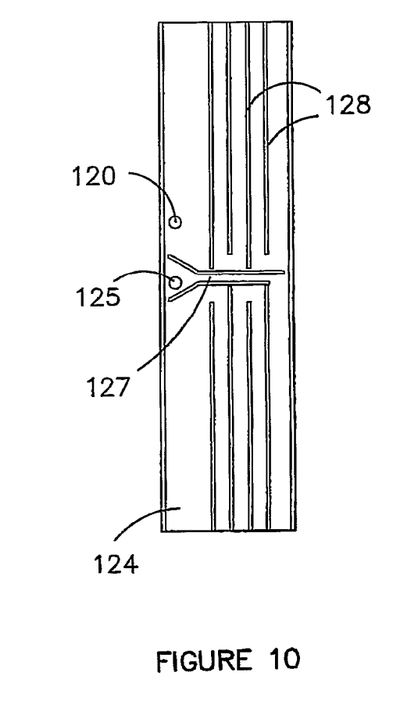
FIG. 10 is a developed view of the sleeve shown in FIG. 9.
Figure 11:
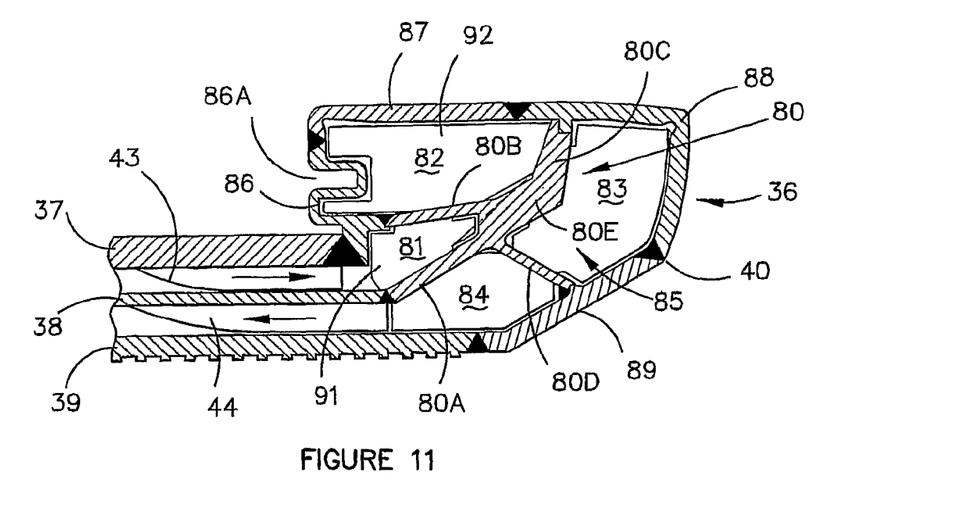
FIG. 11 is a detail to an enlarged scale showing the construction of a duct tip at the forward or lower end of an outer duct of the lance.
Figure 12:
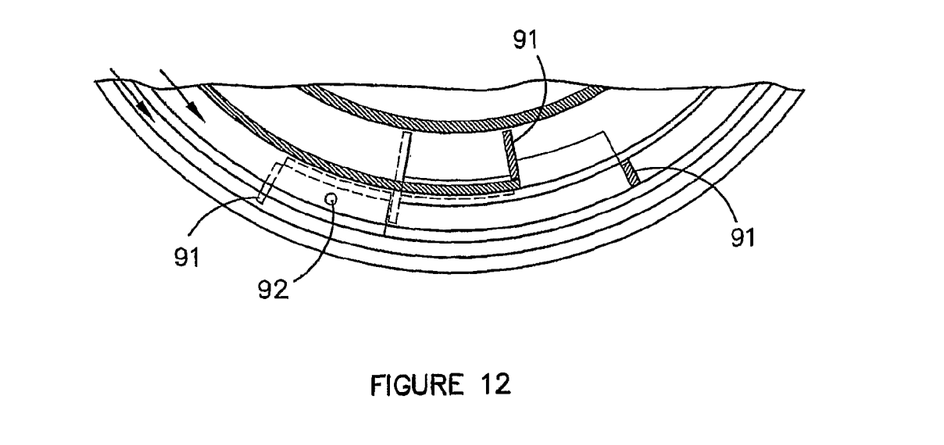
FIG. 12 is a partial cross-section through part of the duct tip.
Figure 13:
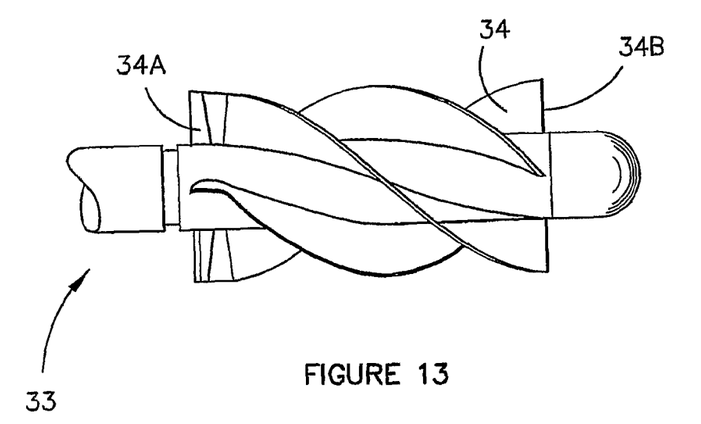
FIGS. 13 and 14 illustrate the construction of a front part of a central structure of the lance.
Figure 14:
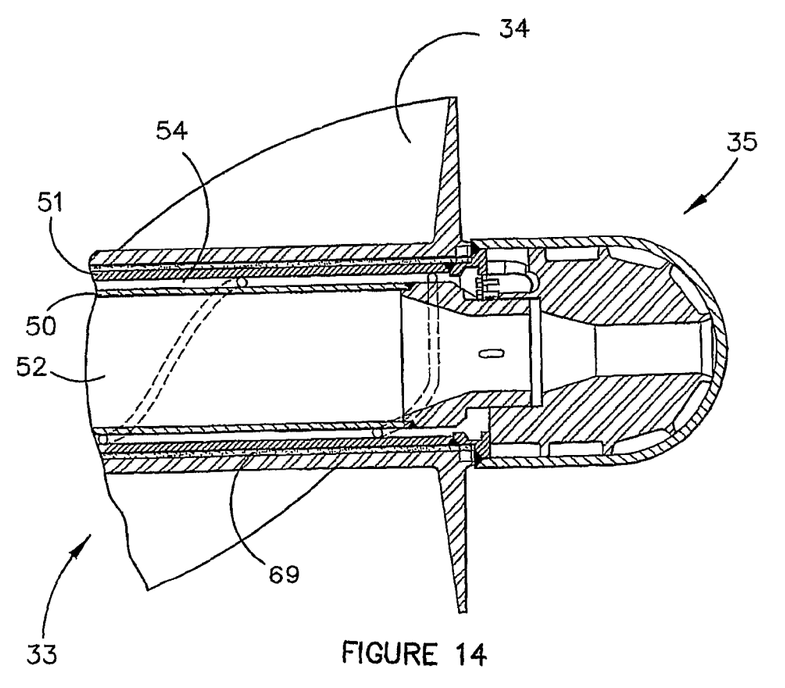
Figure 15:
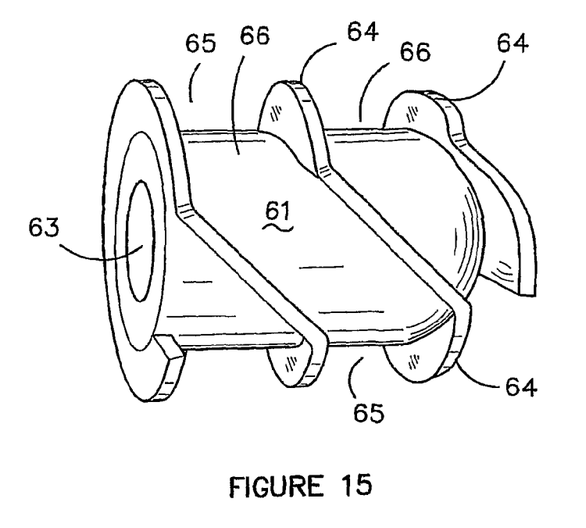
FIGS. 15 and 16 illustrate the construction of a forward nose end of the central structure of the lance.
Figure 16:
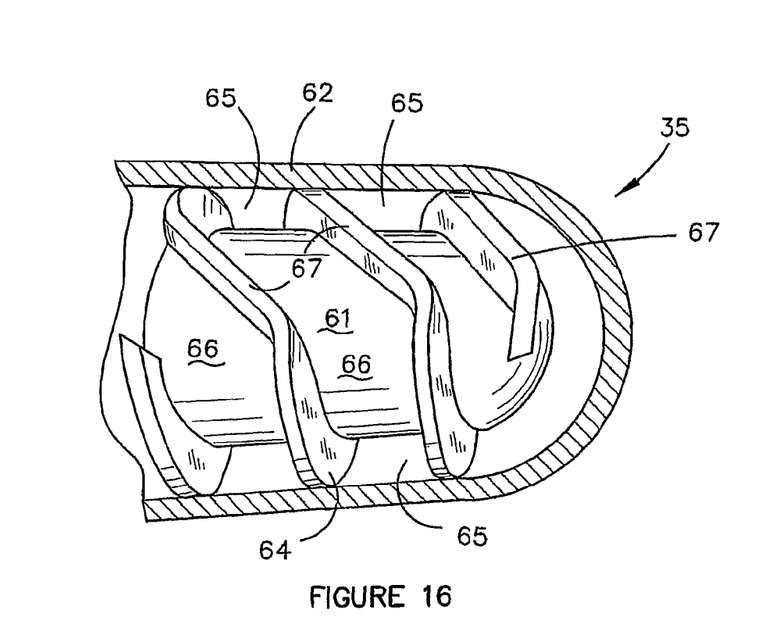
Figure 17:
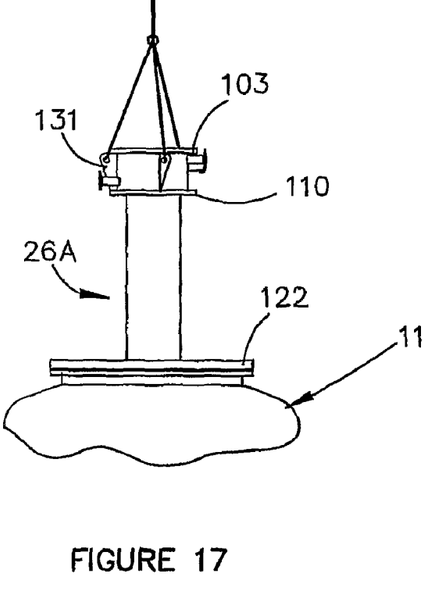
FIGS. 17, 18 and 19 illustrate successive steps carried out in the installation of the lance into the smelting vessel.

The construction of the hot air injection lance 26 is illustrated in FIGS. 4A/4B to 14. In accordance with present embodiments, the lance is made from three separate modules 26A, 26B and 26C which are fabricated separately and are brought together in successive steps and releasably connected together during installation of the lance into the vessel in the mariner to be described below with particular reference to FIGS. 15 to 17.

Lance module 26A is a main duct module providing an elongate duct 31 through which to direct hot gas into the upper region of the vessel. Lance module 26B is a gas inlet module providing a gas inlet structure 32 through which to direct hot gas into the elongate duct 31 of the lance module 26A. Lance module 26C is a central module which includes an elongate central tubular structure 33 that extends within the gas flow duct 31 and carries adjacent its forward or lower end a series of swirl imparting vanes 34 for imparting swirl to the gas flow exiting the duct. Swirl vanes 34 may be formed to a four start helical configuration. Their inlet (rear) ends may have a smooth transition from initial straight sections to a fully developed helix to minimise turbulence and pressure drop.

The lance is water cooled by a series of water cooling circuits and/or elements. These circuits and/or elements are isolated from each other and therefore operate independently of each other, though they may be supplied with cooling water from a common header and may return cooling water to a common header. The water cooling circuits and/or elements of each one of the modules 26A, 26B & 26C are isolated from the water cooling circuits and/or elements of each one of the other modules 26A, 26B & 26C.

Lance modules 26A and 26C reside, in use, substantially internally of the vessel and experience a temperature gradient and therefore non-uniform cooling requirements along their length, with the highest temperatures seen at the forward end of the lance adjacent the tip where combustion of off-gas occurs. Temperatures in this region may be in the order of 2000° C.-2200° C. The hot blast through the gas flow duct has a temperature of 1200° C. and the temperatures external of the lance and away from the tip are typically in the range 1400° C.-1500° C.

As detailed below, lance modules 26A & 26C are of elongate construction with parallel, or at least double layer, water flow passages constructed from concentric tubes of substantially cylindrical construction. The tubes are retained within each module in a manner to allow for two or more of the tubes or other members to experience differential expansion. The parallel, or at least double layer, water flow passages allow the inlet and outlet connections of these passages to reside external to the vessel.

Lance module 26B resides, in use, substantially externally of the vessel and experiences a substantially uniform temperature gradient comprised of 1200° C. internally due to the flow of hot blast and ambient temperature conditions externally. Lance module 26B is constructed of substantially parallel concentric tubes that provide a single layer flow path for cooling water that is divided by one or more partitions into two or more water flow galleries. The single layer flow path being sufficient for the cooling requirements of module 26B which has a reduced need to allow for differential thermal expansion within the cooling circuits.

The forward end of central structure 33 has a domed nose 35 which projects forwardly beyond the tip 36 of duct 31 so that the forward end of the central body and the duct tip co-act together to form an annular nozzle for divergent flow of gas from the duct with swirl imparted by the vanes 34.

The wall of the main part of duct 31 extending downstream from the gas inlet 32 is internally water cooled. This section of the duct is comprised of a series of three concentric steel tubes 37, 38, 39 extending to the forward end part of the duct where they are connected to the duct tip 36. The duct tip 36 is of hollow annular formation and is internally divided by a partitioning structure 80 which divides the interior of the tip into four water flow galleries 81, 82, 83, 84 which interconnect to form a single cooling water passage denoted generally as 85 to which cooling water is supplied and returned through passages in the wall of duct 31. Specifically, cooling water, is supplied through an inlet 41 and annular inlet manifold 42 into an inner annular water flow passage 43 defined between the tubes 37, 38 of the duct through to the duct tip 36. Water is returned from the tip through an outer annular water return flow passage 44 defined between the tubes 38, 39 and backwardly to a water outlet 45 at the rear end of the water cooled section of duct 31.

Duct tip 36 has an outer shell 40 formed by four annular segments 86, 87, 88 and 89 which are welded together to form the outer shell. Segment 86 forms a rear wall of the duct tip 36 and is welded to the innermost tube 37 of the tubes constituting the wall of the duct. Partitioning structure 80 comprises a steel ring disposed within the tip shell 40 and provided with four circumferential flanges 80A, 80B, 80C and 80D projecting outwardly from a central part 80E of the ring so as to divide the interior of the shell into the water flow galleries 81-84 and to serve as buttress supports for the shell. Flange 80A is welded to the intermediate tube 38 of the duct wall and flanges 80B and 80D are welded to tip shell segments 86 and 89 to complete the interconnection of the tip to the duct wall and to divide the interior of the tip into the cooling water flow galleries 81, 82, 83 and 84. Baffles 91, are fitted between the partition structure 80 and the shell to define ends of the water flow galleries. Ports 92 are located in the flanges of the partitioning ring adjacent these baffles to cause the water to flow successively around the tip firstly through gallery 81 then through gallery 82 then through gallery 83 and finally to gallery 84. The water enters gallery 81 from the water flow passage 43 defined between the tubes 37, 38 of the duct and exits gallery 84 through return passage 44 defined between the tubes 38, 39.

The duct tip shell segments 87 and 88 defining the inner periphery and outer end of the tip are made of copper to enhance cooling of these parts of the tip whereas the segments 86 and 89 and the partitioning structure 80 are formed of steel to produce a very strong reinforced tip structure which allows for the transmission of load forces from the inner and intermediate tubes 37, 38 to the outer tube 39 of the duct as described in more detail below.

The lance module 26A is provided at its rear end with a mounting assembly 101 comprising a water cooled outer housing 102 connected through a flange 100 to the outer duct tube 39 and to a mounting flange 110 for connection to an upper part of the vessel such that the lance will be suspended in a vertical orientation from the mounting flange 110 with all of its weight taken through the outer duct tube 39. The rear end of the intermediate tube 38 is supported by a sliding seal 104 within the housing 102 and the rear end of the inner tube 37 is supported within a sliding seal 105 in a rear end flange 103 of the module 26A to permit relative longitudinal movements of the tubes on differential expansion of the various lance components. So as not to overload these sliding seals 104 & 105, the weight of the cooling water, refractory, inner tube 37 and the intermediate tube 38 are transferred by partitioning structure 80 to the outer tube 39.

The rear end flange 103 of lance module 26A provides a mounting for the gas inlet lance module 26B. Module 26B comprises a tubular body 106 and a branch tube 107 branching laterally from the tubular body to serve as a gas inlet for inlet of gas to the tubular body and thence to the interior of the main duct module 26A. The forward or lower end of tubular body 106 is provided with a circumferential flange 111 to abut the rear flange 103 of the module 26A and the abutting flanges 103, 111 are releasably fastened together by fastening bolts 112 during the lance installation process as will be described below. Branch tube 107 of module 26B is also provided with a connector flange 113 by which it can be connected to a hot air supply duct.

The upper end of module 26B is provided with an end flange 114 which serves as an abutment for a flange 115 at the rear or top end of the central module 26C and the abutting flanges 114, 115 are releasably connected together by connecting bolts 116 during assembly of the lances as described below.

Lance module 26B is formed as an outer double walled steel shell formed with internal water flow passages through which water is circulated through inlet and outlet connectors 120, 130. The space between the double walls provides a single layer flow path and may be divided by partitions 175 so as to provide a series of water flow galleries 178 that may be arranged in any convenient pattern. The water flow galleries 178 may be divided by central partition 180 into upper 190 and lower 192 cooling flow paths. The interior of the module 26B is lined with refractory material 118.

The water cooled section of duct 31 is internally lined with an internal refractory lining 46 that fits within the innermost metal tube 39 of the duct and extends through to the water cooled tip 36 of the duct. The inner periphery of duct tip 36 is generally flush with the inner surface of the refractory lining which defines the effective flow passage for gas through the duct. The forward end of the refractory lining has a slightly reduced diameter section 47 which is generally flush with the inner periphery of the duct tip 36. The refractory lining is formed in sections fitted within the inner duct tube 37. When the lance is installed and in a vertical condition, the bottom section of the lining sits on the rear wall 86 of the duct tip and the other lining sections are supported on bricking rings 90 welded to the tube 39. Accordingly, the full weight of the refractory lining is imparted downwardly on to the inner tube 37 of the duct. Since the duct is fully supported by its upper end through the outer tube 39, this downward loading must be transferred from the inner tube to the outer tube through the interconnection provided by the tip wall 86, the partitioning structure 80 and the tip structure 89 all of which are made of steel and which provide a very solid rigid and braced interconnection capable of transmitting those forces.

Rearwardly from section 47 the refractory lining is of slightly greater diameter to enable the central structure 33 to be inserted downwardly through the duct on assembly of the lance without fouling the refractory. The swirl vanes 34 are then moved within the reduced diameter section of the refractory until their forward ends enter within the rearmost part of the duct tip 36. In the final assembly the vanes extend along central structure 33 from rear ends 34A spaced rearwardly from the duct tip 36 to forward ends 34B disposed within the duct tip. Vanes 34 are dimensioned so that there is a small radial clearance between the vanes and the refractory lining of the duct. They are also dimensioned so that when the lances is in a cold condition there is a small radial clearance of the order of 2 mm between the forward ends of the vanes and the inner periphery of the duct tip 36 but on thermal expansion under operating conditions the forward ends of the vanes are engaged by the internally water cooled tip which then provides lateral support for the vanes and the lower end of the central structure 33. The central structure is long and flexible and if it is not supported the gas blast can cause severe vibration. With the illustrated arrangement lateral support is provided through the engagement of the cooled tip with the vanes. The vanes may be made of a cobalt alloy material such as UMCO 50. They may be formed on a sleeve simply fitted over the lower end of the central structure and keyed to prevent rotation.

The rear wall 86 of duct tip 36 is formed with a deformable midsection to accommodate radial loading on the wall on engagement with the front ends of the vanes 34. More specifically, the annular tip shell segment forming that wall is provided with a deformable corrugation 86A of U-shaped cross-section which can close up to accommodate excess loading on the wall so as to limit stresses in the wall under radial loads generated by thermal movements under the severe operating conditions generated by the HIsmelt process.

The front end of central structure 33 which carries the swirl vanes 34 is internally water cooled by cooling water supplied forwardly through the central structure from the rear end to the forward end of the lance and then returned back along the central structure to the rear end of the lance. This enables a very strong flow of cooling water directly to the forward end of the central structure and to the domed nose 35 in particular which is subjected to very high heat flux in operation of the lance.

Central structure 33 comprises inner and outer concentric steel tubes 50, 51 formed by tube segments, disposed end to end and welded together. Inner tube 50 defines a central water flow passage 52 through which water flows forwardly through the central structure from a water inlet 53 at the rear end of the lance through to the front end nose 35 of the central structure and an annular water return passage 54 defined between the two tubes through which the cooling water returns from nose 35 back through the central structure to a water outlet 55 at the rear end of the lance.

The nose end 35 of central structure 33 comprises an inner copper body 61 fitted within an outer domed nose shell 62 also formed of copper. The inner copper piece 61 is formed with a central water flow passage 63 to receive water from the central passage 52 of structure 33 and direct it to the tip of the nose. Copper body 61 is formed with projecting ribs 64 which fit snugly within the nose shell 62 to define a single continuous cooling water flow passage 65 between the copper body 61 and the outer nose shell 62. The ribs 64 are shaped so that the single continuous passage 65 extends as annular passage segments 66 interconnected by passage segments 67 sloping from one annular segment to the next. Thus passage 65 extends from the tip of the nose in a spiral which, although not of regular helical formation, does spiral around and back along the nose to exit at the rear end of the nose into the annular return passage formed between the tubes 51, 52 of central structure 33.

The forced flow of cooling water in a single coherent stream through spiral passage 65 extending around and back along the nose end 35 of central structure ensures efficient heat extraction and avoids the development of "hot spots" on the nose which could occur if the cooling water is allowed to divide into separate streams at the nose. In the illustrated arrangement the cooling water is constrained in a single stream from the time that it enters the nose end 35 to the time that it exits the nose end.

Inner structure 33 is provided with an external heat shield 69 to shield against heat transfer from the incoming hot gas flow in the duct 31 into the cooling water flowing within the central structure 33. If subjected to the very high temperatures and high gas flows required in a large scale smelting installation, a solid refractory shield may provide only short service. In the illustrated construction the shield 69 is formed of tubular sleeves of ceramic material marketed under the name UMCO. These sleeves are arranged end to end to form a continuous ceramic shield surrounding an air gap between the shield and the outermost tube 51 of the central structure. Further details of the manner in which the shield may be formed will be found in the disclosure of U.S. Pat. No. 6,673,305.

On installation of the lance within the vessel, mounting sleeve 110 is fastened by means of fastening bolts 121 to a flange 122 at the upper end of a tubular opening 123 in an upper wall of the vessel. Mounting flange 110 is formed with a hollow tubular extension sleeve 124 which projects within the tubular opening 123 and is internally water cooled by flow of cooling water through an inlet 125 and outlet 126 extending through the mounting flange 110. Water from the inlet 125 is passed through the internal channel 127 to the bottom end of the tubular sleeve 124 and then flows back through that tubular sleeve successively through a series of circumferential galleries formed by internal circumferential partitions 128 within the walls of the sleeve. The cooling of sleeve 124 within the tubular opening 123 of the vessel causes slag to freeze within the bottom of the opening to close the opening and reduce heat flow through the opening. The sleeve 124 is a clearance fit within the opening and also extends around the lance body with a small clearance, the clearance spaces being closed by the frozen slag. This arrangement protects the vessel opening and flange 122 from overheating and avoids the need to provide cooling passages in this part of the vessel. The size of the sleeve 124, and more particularly the outer diameter of the sleeve, are selected so that there is a clearance between the tubular opening 123 and the lance module 26A and a layer of frozen slag that inevitably forms on the outer wall of the module in use of the lance. With this arrangement, the lance module 26A and the frozen slag can be withdrawn from the vessel without contacting the tubular opening 123. This is an important feature from the viewpoint of minimising the possibility of frozen slag on the lance module 26A damaging the vessel or the lance module during withdrawal.

Figure 18:
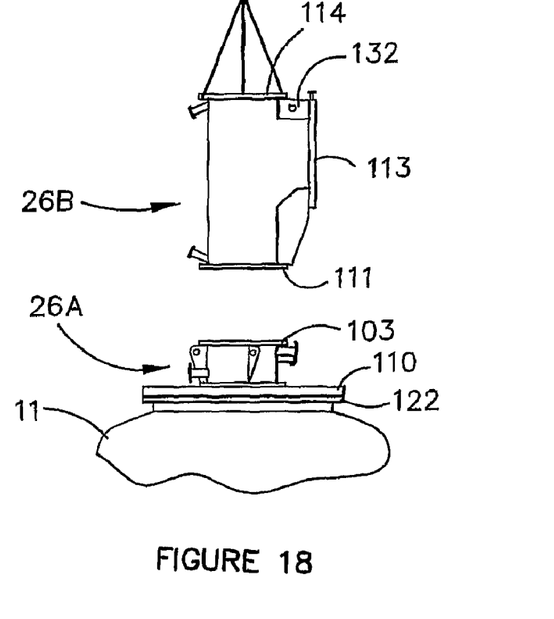
Figure 19:
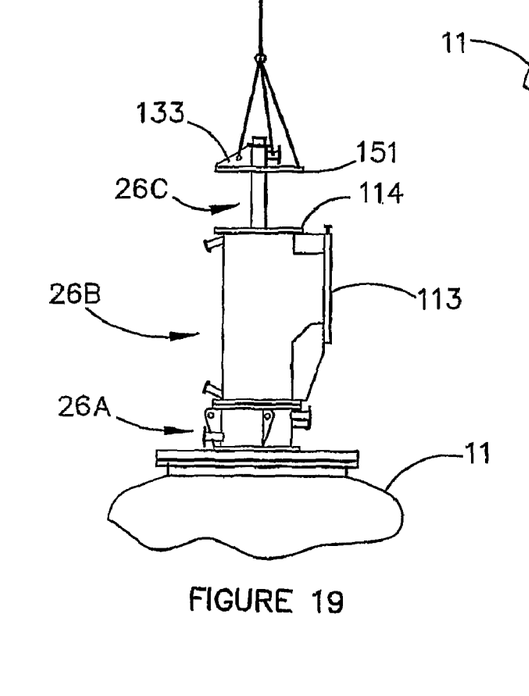

The manner of installing the lance is illustrated in FIGS. 18 to 20. The three lance modules 26A, 26B and 26C are fabricated separately and brought to the site of the vessel for successive installation. In a first installation step, the main duct module 26A is lifted on a crane through lifting lugs 131 at the extreme upper end of the module so that the module hangs vertically from the crane and can be inserted downwardly through the tubular opening 123 in the upper wall of the vessel as illustrated in FIG. 18. Module 26A is lowered until the mounting flange 110 abuts the flange 122 on the vessel and the flanges 110 and 122 are then firmly fastened together by the fastening bolts 121.

In a second installation step, the gas inlet module 26B is lifted on a crane through lifting lugs 132 at the upper end of the module so that the tubular body of the module hangs vertically downwards as seen in FIG. 19. Module 26B is lowered until the flange 111 at its lower end abuts the flange 103 at the upper end of the module 26A and the flanges 111, 103 are connected together by connecting bolts 112.

In a third installation step, the central lance module 26C is lifted on a crane through lifting lugs 133 at the upper end of that module so that the module hangs vertically downwards and can be extended downwardly through the gas inlet module 26B and into the main duct module 26A as seen in FIG. 20. The central module is lowered until its flange 115 comes into abutment with the flange 114 at the upper end of the gas inlet module and the flanges 114 and 115 are fastened together by the fastening bolts 116 to complete installation of the lance. In the completed installation, the central module is suspended from its connection with the upper (rear) end of the gas inlet module so as to hang vertically downwards within the tubular body of the gas inlet module and the interior of the main duct module.

To remove the lance the three lance modules are successively released and lifted by means of a crane in the reverse order to their installation, that is the central module 26C is removed first followed by the modules 26B and 26A.

The modular construction and installation method described above enables the fabrication and installation of very large and heavy lances in large scale direct smelting plant.

The invention claimed is:

1. A lance for injecting gas into a vessel, including:
   a gas flow duct extending from a rear end to a forward end from which to discharge gas from the duct;
   an elongate central structure extending within the gas flow duct from its rear end to its forward end;
   a plurality of flow directing vanes disposed about the central structure adjacent the forward end of the duct to impart swirl to a gas flow through the forward end of the duct;
   cooling water supply and return passages extending through the wall of the gas flow duct and extending from the rear end to the forward end of the gas flow duct for supply and return of cooling water to the forward end of the duct; and
   an annular duct tip disposed at the forward end of the duct and having an internal cooling water passage connecting with the cooling water supply and return passages so as to receive and return a flow of cooling water to internally cool the duct tip;
   wherein the lance is made of three modules releasably fastened together by releasable fasteners, said modules comprising:
   1) a main duct module forming the gas flow duct throughout a major part of the length of the main duct module and including said water supply and return passages defined by an outer tube, an intermediate tube, and an inner tube and said annular duct tip, the main duct module having a mounting assembly comprising a water-cooled outer housing having a flange for connecting to the outer tube of the main duct module and having sliding seals supporting the intermediate tube and the inner tube of the main duct module to permit relative longitudinal movements of the intermediate tube and the inner tube on differential thermal expansion relative to the outer tube,
   2) a gas inlet module including a tubular body releasably fastened by a first set of said fasteners to a rear end of the main duct module such that its interior connects with the interior of the main duct module and a branch tube branching laterally from the tubular body to serve as a gas inlet for inlet of gas to the tubular body and thence to the interior of the main duct module, and
   3) a central module forming said elongate central structure and said flow directing vanes and releasably fastened by a second set of said fasteners to a rear end of the tubular body of the gas inlet module.

2. The lance as claimed in claim 1, wherein the rear end of the main duct module and the forward end of the gas inlet module are formed with abutting circumferential flanges and the first set of fasteners releasably fastens those flanges together.

3. The lance as claimed in claim 1, wherein the rear end of the tubular body of the gas inlet module and the rear end of the central module are formed with abutting circumferential flanges and the second set of fasteners releasably fasten those flanges together.

4. The lance as claimed in claim 1, wherein the main duct module includes an outwardly projecting mounting flange spaced forwardly from the rear end of the main duct module for mounting the lance on a wall of a metallurgical vessel.

5. The lance as claimed in claim 4, wherein the outwardly projecting mounting flange is disposed about a tubular sleeve extending circumferentially around the duct and provided with internal water flow passages for internal cooling of the sleeve.

6. The lance as claimed in claim 5, wherein the tubular sleeve extends forwardly from said outwardly projecting mounting flange so as in use of the lance to project into an opening in a wall of the vessel in which the lance is to be mounted.

7. The lance as claimed in claim 4, wherein the main duct module comprises water inlet and outlet connectors connecting with the cooling water supply and return passages and disposed between the rear end of the main duct module and the outwardly projecting mounting flange.

8. The lance as claimed in claim 1, wherein the main duct module, gas inlet module and central module each further comprises at least one cooling circuit for in use receiving a flow of cooling water, the cooling circuits operating independently.

9. The lance as claimed in claim 1, wherein the supply and return passages of the main duct module comprise substantially parallel annular flow paths provided by three or more concentric substantially cylindrical members retained within said main duct module to provide for differential expansion of two or more of said substantially cylindrical members.

10. The lance as claimed in claim 1, wherein the gas inlet module comprises two concentric substantially cylindrical members to provide a single layer flow path for cooling water between said substantially cylindrical members.

11. The lance as claimed in claim 10, wherein one or more partitions provide said single layer flow path of said gas inlet module with two or more water flow galleries.

12. The lance as claimed in claim 11, wherein said single layer flow path comprises two independent water flow circuits.

13. The lance as claimed in claim 10, wherein the branch tube extends laterally from a central axis of the gas inlet module, the branch tube comprises a flange for connection to a gas supply duct and said single layer flow path extends about said branch tube.

14. The lance as claimed in claim 1, wherein the main duct module comprises:
   a tubular lance body that defines the gas flow duct, the tubular lance body in use extending through an opening in the vessel and into the vessel, and having a flange projecting outwardly from the tubular lance body, and a tubular sleeve that extends circumferentially around the lance body in the vicinity of the flange, and having a mounting flange for connection to an upper part of the vessel, wherein the tubular sleeve extends along the lance body from the mounting flange and is provided with internal water flow passages for internal cooling of the tubular sleeve, and wherein the flange of the lance body is connected to the mounting flange of the tubular sleeve.

15. The lance as claimed in claim 14, wherein the mounting flange for connecting the tubular sleeve to an upper part of the vessel projects outwardly beyond the circumference of the flange on the lance body.

16. The lance as claimed in claim 14, wherein the tubular sleeve extends along the lance body from the mounting flange of the tubular sleeve so as in use of the lance to project into the opening of the vessel in which the lance is to be mounted.

17. The lance as claimed in claim 14, wherein the sleeve has an outer diameter that, in use, enables the lance body and a layer of frozen slag that forms on the lance body to be withdrawn from the vessel via the vessel opening without contacting the vessel opening.

18. The lance as claimed in claim 1, wherein:
the main duct module comprises a tubular lance body that defines the gas flow duct and that further comprises three or more concentric substantially cylindrical members to provide said elongate supply and return passages and said substantially cylindrical members retained within said lance so as to provide for differential expansion of two or more of said substantially cylindrical members, and the gas inlet module includes a gas inlet member that defines the tubular body and the branch tube, said gas inlet member comprising two concentric substantially cylindrical members providing a single layer flow path for flow of cooling water between said substantially cylindrical members.

19. The lance as claimed in claim 18, wherein the supply and return passages of the tubular lance body operate independently of the single layer flow path of the gas inlet member.

20. The lance as claimed in claim 18, wherein one or more partitions provide said single layer flow path of said gas inlet member with two or more water flow galleries.

21. The lance as claimed in claim 20, wherein said single layer flow path comprises two independent water flow circuits.

22. The lance as claimed in claim 18, wherein the branch tube extends laterally from an axis of the tubular body, and the branch tube comprises a flange for connection to a gas supply duct, the single layer flow path extending about said branch tube.

23. The lance as claimed in claim 1, wherein the mounting assembly connects the lance to a vessel such that the lance is suspended in a vertical orientation with the weight of the lance borne through the mounting assembly.

* * * * *